(12) United States Patent
Linde et al.

(10) Patent No.: US 11,299,024 B2
(45) Date of Patent: Apr. 12, 2022

(54) STRUCTURAL ELEMENT, A BATTERY SET, AN ARRANGEMENT OF A STRUCTURAL ELEMENT AND A BATTERY SET, AND AN AEROSPACE VEHICLE

(71) Applicant: Airbus Operations GmbH, Hamburg (DE)

(72) Inventors: Peter Linde, Hamburg (DE); Peter Rostek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 403 days.

(21) Appl. No.: 16/422,327

(22) Filed: May 24, 2019

(65) Prior Publication Data

US 2019/0341592 A1 Nov. 7, 2019

Related U.S. Application Data

(63) Continuation of application No. PCT/EP2017/080279, filed on Nov. 23, 2017.

(30) Foreign Application Priority Data

Nov. 24, 2016 (EP) .................................. 16200606

(51) Int. Cl.
*B64D 41/00* (2006.01)
*B60K 1/04* (2019.01)
(Continued)

(52) U.S. Cl.
CPC ................ *B60K 1/04* (2013.01); *B60L 50/64* (2019.02); *B60L 53/80* (2019.02); *B64C 39/10* (2013.01);
(Continued)

(58) Field of Classification Search
CPC .... B64D 41/00; B64D 27/24; B64D 2221/00; H01M 2220/20; B64C 39/10; B64C 2039/105
See application file for complete search history.

(56) References Cited

U.S. PATENT DOCUMENTS 7,325,772 B1 * 2/2008 Hanewinkel, III .... B64D 13/00
244/129.4
8,967,529 B1 * 3/2015 Bennett .................. B64D 27/24
244/53 R (Continued)

FOREIGN PATENT DOCUMENTS

CN 204473148 U 7/2015
CN 205488366 U 8/2016

(Continued)

OTHER PUBLICATIONS

European Office Action for Application No. 16200606.8 dated Mar. 17, 2020.

(Continued)

*Primary Examiner* — Brian M O'Hara
(74) *Attorney, Agent, or Firm* — Jenkins, Wilson, Taylor & Hunt, P.A.

(57) ABSTRACT

An arrangement of a structural element for an aerospace vehicle and a battery set. The structural element extends along a longitudinal direction and has a main web, a first flange and a second flange. The flanges extend away from the main web and are defined by flange edges extending along the longitudinal direction. The first flange, the second flange and the main web form a U-shaped profile defining a cavity. The battery set includes a baseplate and at least one battery on the baseplate. The structural element and the battery set are formed such that the baseplate can be releasably attached to the structural element. The baseplate extends between flange edges and the battery is received in (Continued)

the cavity when the battery set is mounted to the structural element. Further, an aerospace vehicle including such an arrangement, a structural element for an aerospace vehicle and a battery set are disclosed.

11 Claims, 3 Drawing Sheets

(51) Int. Cl.
  *B64C 39/10* (2006.01)
  *B64D 27/24* (2006.01)
  *B60L 50/64* (2019.01)
  *B60L 53/80* (2019.01)
  *H01M 50/20* (2021.01)

(52) U.S. Cl.
  CPC ............ *B64D 27/24* (2013.01); *B64D 41/00* (2013.01); *H01M 50/20* (2021.01); *B64C 2039/105* (2013.01); *B64D 2221/00* (2013.01); *H01M 2220/20* (2013.01)

(56) References Cited

U.S. PATENT DOCUMENTS

| | | | |
|---|---|---|---|
| 9,365,088 B2 * | 6/2016 | Belik | B64C 25/52 |
| 2004/0195438 A1 * | 10/2004 | Chamberlain | A63H 27/02 |
| | | | 244/65 |
| 2004/0211862 A1 * | 10/2004 | Elam | B64D 27/24 |
| | | | 244/58 |
| 2008/0138698 A1 | 6/2008 | Ogami et al. | |
| 2008/0248377 A1 | 10/2008 | Hashida | |
| 2016/0272316 A1 | 9/2016 | Nelson | |

FOREIGN PATENT DOCUMENTS

| | | |
|---|---|---|
| GB | 2 490 141 A | 10/2012 |
| JP | 2004-227921 A | 8/2004 |
| JP | 2011-131790 A | 7/2011 |

OTHER PUBLICATIONS

European Office Action for Application No. 16200606.8 dated Jul. 10, 2019.
European Search Report for Application No. 16200606.8 dated Jun. 8, 2017.
International Search Report and Written Opinion for Application No. PCT/EP2017/080279 dated Apr. 13, 2018.
Chinese Office Action for Application No. 201780072638 dated Dec. 27, 2021.

* cited by examiner

STRUCTURAL ELEMENT, A BATTERY SET, AN ARRANGEMENT OF A STRUCTURAL ELEMENT AND A BATTERY SET, AND AN AEROSPACE VEHICLE

CROSS-REFERENCE TO RELATED APPLICATIONS

This patent application is a continuation of and claims priority to International Application No. PCT/EP2017/080279 filed Nov. 23, 2017, which claims priority to European Patent Application No. 16200606.8 filed Nov. 24, 2016, the entire disclosures of which are incorporated by reference herein.

TECHNICAL FIELD

The disclosure herein is directed to an arrangement of a structural element for an aerospace vehicle and a battery set. The disclosure herein is further directed to an aerospace vehicle comprising such an arrangement, a structural element for releasably mounting a battery set in an aerospace vehicle and a battery set for releasably mounting to a structural element of an aerospace vehicle.

BACKGROUND

In recent years there has been a more and more pronounced interest in increasing the number of transportation means that are operated using electric drive means. Regardless of whether the transportation means are entirely driven by electric energy or whether electric energy is only used to supplement drive means operating on fossil fuels, storage of electric energy onboard the transportation means is an ongoing issue. One of the key problems with any electrically driven transportation means is the storage of the required electric energy. As the energy density of batteries is lower than the energy density of fossil fuels, batteries providing sufficient energy for powering electrically driven transportation means are very heavy. In fact, the high weight of batteries drastically limits the range of today's electric vehicles. This problem is even more pronounced onboard aerospace vehicles if these shall be driven or at least partially driven using electricity. In addition, heavy batteries need dedicated structures supporting the batteries onboard the vehicle. This further increases the vehicle's weight and reduces its range.

One approach of providing storage space for batteries targeting this problem is the use of so-called structural batteries which combine the storage of electrical energy and a structure. Two different kinds of structural batteries are currently researched. One approach uses multi-functional materials that at the same time provide the structure of the vehicle and are able to store electric energy. These materials are also referred to as composite batteries. The other more conventional approach suggests multifunctional structures where hollow structural elements of a vehicle are "filled" with batteries. For example, anodes and cathodes of a lithium ion battery are placed inside an automotive frame with a rectangular-shaped profile. While the latter approaches may be useful in the automotive industries, they cannot be readily applied in the aerospace industries.

SUMMARY

In view of the foregoing it is, therefore, an object of the disclosure herein to provide an improved approach for storing batteries onboard an aerospace vehicle under consideration of the specific demands of the aerospace industries.

In a first aspect the problem is solved by an arrangement of a structural element for an aerospace vehicle and a battery set. The structural element extends along a longitudinal direction and has a main web, a first flange and a second flange. The first flange extends away from the main web and is delimited or defined by a first flange edge extending along the longitudinal direction. The second flange extends away from the main web in a position apart from the first flange such that the first flange, the second flange and the main web form a U-shaped profile defining a cavity. The second flange is delimited by or comprises a second flange edge extending along the longitudinal direction. The battery set comprises a baseplate and at least one battery arranged on the baseplate. The structural element and the battery set are formed such that the baseplate of the battery set can be releasably attached to the structural element for mounting the battery set to the structural element, the baseplate extends from the first flange edge to the second flange edge when the baseplate has been attached to the structural element for mounting the battery set to the structural element and the at least one battery arranged on the baseplate is received in the cavity when the baseplate has been attached to the structural element for mounting the battery set to the structural element.

In other words, the arrangement of the disclosure herein comprises two parts each forming by themselves inventive concepts: a structural element for an aerospace vehicle and a battery set. The structural element is specifically adapted for releasably mounting a battery set in an aerospace vehicle and the battery set is in turn also adapted for being releasably mounted to a structural element of an aerospace vehicle.

The structural element may, for example be a spar of an aircraft wing or a rip or frame of an aircraft fuselage. The structural element extends along a longitudinal direction, for example, along the wing span direction of an aircraft. It may be formed from a composite material and comprises a main web, a first flange and a second flange. The main web may extend in a main web plane, which main web plane extends parallel to the longitudinal direction. On both lateral sides, i.e., in directions extending perpendicular to the longitudinal direction and in the main web plane, the main web is delimited by the first and second flange, respectively.

The flanges may also be planar structures which may extend along planes that extend parallel to the longitudinal direction and inclined with respect to the main web plane. In an exemplary preferred embodiment the planes in which the flanges extend are perpendicular to the main web plane. The first and second flange may be formed in one-piece with the main web, for example, as one composite structure. In any way the first and second flanges and the main web form a continuous structural element.

Both the first and the second flange are delimited on a side that is not connected to the main web but also extends along the longitudinal direction by respective first and second flange edges. Within the scope of the present application two objects extending along the same direction are not necessarily aligned in parallel but may be arranged inclined to one another.

The first and second flanges extend away from different positions or sections of the main web, for example, from different lateral edges of the main web. Thereby, the first and second flange and the main web form a U-shaped profile defining or surrounding a cavity. The U-shaped profile refers to the cross-sectional shape of the structural element where the cross-section is taken in a plane extending perpendicular to the longitudinal direction. In the cross-sectional plane extending perpendicular to the longitudinal direction the first flange, the second flange and the main web surround the cavity on three sides.

The structural element according to the disclosure herein is advantageously a lightweight but nevertheless rigid or stiff structure that is suitable as a spar in an aircraft wing or a blended wing body aircraft fuselage.

For releasably mounting the battery set to the structural elements corresponding structure is required on the structural element and the battery set. In addition, the battery set has to be adapted such that it can be mounted to the previously described structural element. To this end, the battery set comprises a baseplate on which at least one battery is arranged. In a preferred embodiment a plurality of batteries or battery cells formed from a plurality of anodes and cathodes are arranged on the baseplate. The batteries may, for example, be lithium ion or lithium sulfur battery cells. The dimensions of the baseplate and the batteries arranged on the baseplate are limited by the dimensions of the structural element to which the battery set can be releasably mounted.

In particular, the baseplate of the battery set is formed to such that when the battery set is mounted to the structural element the baseplate extends from the first flange edge to the second flange edge. In other words, in the region of the baseplate the cavity defined by the first flange, the second flange and the main web is surrounded in the cross-sectional plane extending perpendicular to the longitudinal direction on the missing fourth side by the baseplate. If the battery set has been mounted to the structural element such that the baseplate is in position, the batteries arranged on the baseplate are received in the cavity formed by the structural element, i.e., the batteries or battery cells are entirely arranged inside a housing formed by the structural element and the baseplate. Thus, the structural element and the baseplate together advantageously form a housing or casing for the battery.

In the disclosure herein the hollow or empty space inside the structural element, i.e., the cavity, is advantageously filled by the battery which saves space that would otherwise be required for placing the batteries onboard an aircraft. Additionally, the batteries do not need an extra casing beyond the baseplate as the structural element in addition to its function as a structure also serves as a protective housing for the batteries. This saves additional weight. Further, due to their heavy weight batteries usually need additional support structures that support them. As the batteries are in the disclosure herein directly integrated into the structures for supporting them, these support structures are not required.

In a preferred embodiment the structural element comprises a first stabilizing web portion. The first stabilizing web portion extends the first flange edge in a direction pointing away from the second flange edge and in parallel to the main web. Additionally or alternatively the structural element comprises a second stabilizing web portion. The second stabilizing web portion extends the second flange edge in a direction pointing away from the first flange edge and in parallel to the main web.

In other words, the structural element preferably comprises a first and/or a second stabilizing web portion. The first and second web portions are attached to the respective first and second flanges of the structural element along the flange edges. The stabilizing portions preferably extend along planes that are parallel to the main web plane. Hence, the planes of the stabilizing web portions may extend perpendicular to the respective flanges, but they can also be arranged inclined under other angles with respect to the flanges. As the stabilizing web portions extend the respective flange edges they are part of the latter. Thus, a baseplate extending from the first flange edge to the second flange edge may, for example, also extend from the first stabilizing web portion to the second stabilizing web portion or from the first or second stabilizing web portion to the respective second or first flange edge.

The stabilizing web portions increase the rigidity of the structural element, in particular, when the baseplate of the battery set is not attached to the structural element.

The structural element is preferably a spar of a wing of an aerospace vehicle or part of a supporting structure of the fuselage of an aerospace vehicle, the aerospace vehicle preferably being a blended wing body aircraft. Given the dimensions of the battery set to be housed in the structural element or, to be more precise, in the cavity defined by the structural element the structural element is preferably a rather large structure of the aerospace vehicle. An example of such a structure may be a front or rear spar of the wing of an aircraft, such as the front or rear spars commonly used in the wings of glider aircraft. Using front and rear spars on commercial airliners could provide sufficient storage space for batteries which provide sufficient supplemental propulsion energy during flight situations in which a lot of thrust is required, for example, during takeoff.

It is further preferred if an outer surface of the baseplate of the battery set facing away from the at least one battery arranged on the baseplate is adapted to be a part of an outer wall of the aerospace vehicle when mounted to structural element. In other words, the baseplate of the battery set preferably also serves as, for example, the outer skin of the fuselage or as a wing surface. This has the advantage that no additional covers are required which provides for a lightweight design.

Further, the battery set can be easily accessed and replaced if it is arranged directly underneath the outer skin of the aerospace vehicle. For example, if an aerospace vehicle carries the batteries in the structural element according to the disclosure herein they can be easily replaced once the aircraft has touched down. This is of particular importance if the batteries shall be used to supply power only during takeoff. On short-distance flights the flight time after takeoff may not be sufficient to recharge the batteries using onboard generators. In this case the batteries can be easily removed after touchdown and replaced with fully charged batteries even in the short timeframe currently available between two short distance flights.

In a particularly preferred embodiment the structural element is a spar of a wing of an aerospace vehicle and the surface of the baseplate is a part of a pressure side surface of the wing of the aerospace vehicle. Using the baseplate as part of the pressure side surface of the wing is particularly advantageous as this part of the wing faces towards the ground when the aircraft is parked. Hence, such a battery set can be quickly exchanged as the pressure side surface of the wings is easily accessible for ground personnel.

It is further preferred if the structural element comprises a mount for releasably mounting the battery set to the structural element and the battery set comprises a lock for releasably locking the battery set to the structural element. The mount may, for example, be provided in the form of recesses in the flanges of the structural element which are provided for engagement with a lock in the form of pins which are movably arranged on the baseplate. The pins may, for example, be arranged on the baseplate movable between an engaging or locking position and a non-engaging or non-locking position. In the engaging position the pins would engage the recesses or mount provided on the structural element, when the baseplate is attached to the structural element. Thereby the battery set is safely mounted to the structural element. In the non-engaging position the pins do not engage the recesses in the structural element. This would allow the battery set to be mounted to or dismounted from the structural element, i.e., the baseplate can be attached to the structural element when the pins are in the non-engaging position.

In other words, once the baseplate has been attached to the structural element, the pins are moved to the engaging position in which they lock the battery set to the structural element. For detaching the baseplate from the structural element, the pins are moved back to the non-engaging position. In an exemplary embodiment the pins are connected to locking magnets for moving the between the engaging and the non-engaging position. The locking magnets can be moved by an external magnetic field generated outside of the cavity of the structural element. For example, switching magnets of opposite polarity can be arranged adjacent the outer surface of the baseplate for moving the locking magnets. The pins then move with the locking magnets between the engaging and the non-engaging position. It is further preferred if the pins are biased, for example, by a spring, towards the engaged position.

In a further aspect the problem underlying the disclosure herein is solved by an aerospace vehicle comprising an arrangement according to any of the preceding embodiments.

The aerospace vehicle preferably comprises a wing with a wing surface with a pressure side, wherein the structural element is a spar of the wing and the pressure side of the wing surface comprises a cut-out such that a battery set can be mounted to structural element.

In a preferred embodiment of the aerospace vehicle the outer surface of the baseplate of the battery set at least partly forms the pressure side of the wing surface in the region of the cut-out when the battery set is mounted to the structural element.

The advantages and particularities of the specific embodiments of the aerospace vehicle correspond to the respective advantages and particularities of the arrangements according to the disclosure herein used therein.

The problem is in a further aspect solved by a structural element for releasably mounting a battery set in an aerospace vehicle. The battery set comprises a base plate and at least one battery arranged on the base plate. The structural element extends along a longitudinal direction and has a main web, a first flange and a second flange. The first flange extends away from the main web and is delimited by a first flange edge extending along the longitudinal direction. The second flange extends away from the main web in a position spaced apart from the first flange such that the first flange, the second flange and the main web form a U-shaped profile defining a cavity. The second flange is delimited by a second flange edge extending along the longitudinal direction. The structural element comprises mounting structure, a mount, for releasably mounting the battery set to the structural element. The structural element is formed such that the base plate of the battery set can be releasably attached to the structural element for mounting the battery set in an aerospace vehicle, the base plate extends from the first flange edge to the second flange edge when the base plate has been attached to the structural element for mounting the battery in an aerospace vehicle and the at least one battery arranged on the base plate is received in the cavity when the base plate has been attached to the structural element for mounting the battery set in an aerospace vehicle.

In a preferred embodiment the structural element comprises a first stabilizing web portion, the first stabilizing web portion extending the first flange edge in a direction pointing away from the second flange edge and in parallel to the main web. Alternatively or additionally the structural element comprises a second stabilizing web portion, the second stabilizing web portion extending the second flange edge in a direction pointing away from the first flange edge and in parallel to the main web.

The advantages of the embodiments of the structural element correspond to the advantages of the embodiment of the arrangement according to the disclosure herein including such an embodiment of a structural element.

In a further aspect the problem is solved by a battery set for releasably mounting to a structural element of an aerospace vehicle, the battery set comprising a base plate and at least one battery. The structural element extends along a longitudinal direction. The first flange extends away from the main web and is delimited by a first flange edge extending along the longitudinal direction. The second flange extends away from the main web in a position spaced apart from the first flange such that the first flange, the second flange and the main web form a U-shaped profile defining a cavity. The second flange is delimited by a second flange edge extending along the longitudinal direction. For releasably mounting the battery set to the structural element the battery set comprises a lock for locking the battery set to the structural element and the base plate is adapted to be releasably attached to the structural element such that the base plate extends from the first flange edge to the second flange edge of the structural element. The at least one battery is arranged on the base plate such that it is received in the cavity when the base plate has been releasably attached to the structural element for mounting the battery set to the structural element.

In a preferred embodiment of the battery set an outer surface of the base plate facing away from the at least one battery arranged on the base plate is adapted to be part of an outer wall of an aerospace vehicle when mounted to the structural element.

The advantages of the embodiments of the battery set correspond to the advantages of the embodiment of the arrangement according to the disclosure herein including such an embodiment of a battery set.

BRIEF DESCRIPTION OF THE DRAWINGS

In the following an example embodiment of an arrangement of a structural element for an aerospace vehicle and a battery set including example embodiments of a structural element and a battery set, respectively, as well as an example embodiment of an aerospace vehicle will be described with more reference to the drawings, wherein.

DETAILED DESCRIPTION

Figures 1, 2:
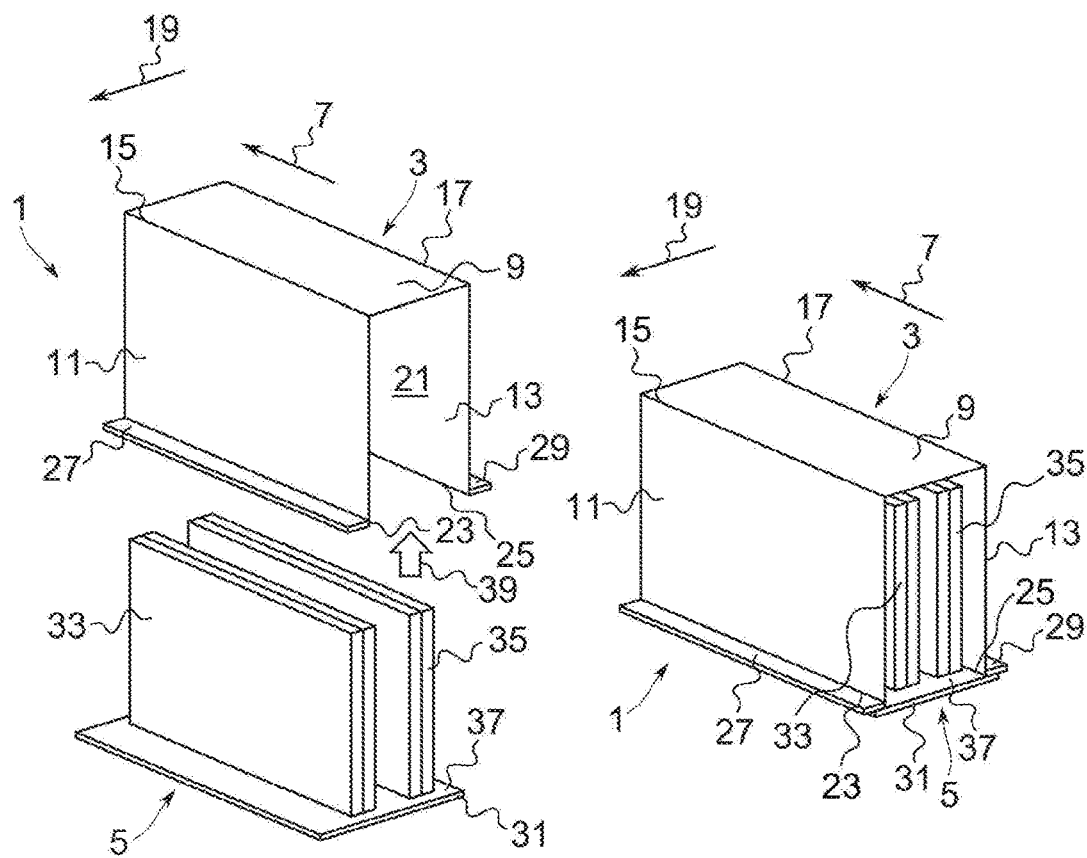
FIG. 1 shows a first perspective view of an exemplary embodiment of an arrangement according to the disclosure herein.
FIG. 2 shows a second perspective view of the exemplary embodiment of FIG. 1.

In the following description of the various figures like reference numerals will be used to designate like elements.

FIG. 1 shows a schematic drawing of an exemplary embodiment of an arrangement 1 of a structural element 3 for an aerospace vehicle and a battery set 5. The structural element 3 is an exemplary embodiment of a structural element 3 according to the disclosure herein. Likewise, the battery set 5 is an exemplary embodiment of a battery set 5 according to the disclosure herein. In FIG. 1 the structural element 3 and the battery set 5 are shown in a dismounted state, i.e., the battery set 5 is not mounted to the structural element 3.

The structural element 3 extends along a longitudinal direction 7 and comprises a main web 9, a first flange 11 and a second flange 13. The structural element 3 is formed from a composite material, for example, from carbon fiber reinforced plastics, and used as a front or rear spar of an aircraft wing. The main web 9 extends generally in the longitudinal direction 7 and in a main web plane which extends parallel to the longitudinal direction 7. At its lateral edges 15, 17 the main web 9 merges into the first and second flanges 11, 13 which extend away from the main web 9 in planes that are perpendicular to the main web plane but parallel to the longitudinal direction 7. The lateral edges 15, 17 at which the main web 9 merges into the first and second flanges 11, 13 also extend along the longitudinal direction 7 and are spaced from one another in a lateral direction 19 extending perpendicular to the longitudinal direction 7. As can be seen in FIG. 1 the main web 9, the first flange 11 and the second flange 13 form a U-shaped profile surrounding a cavity 21.

First and second flanges 11, 13 terminate at the opposite side of the main web 9 in respective first and second flange edges 23, 25. The flange edges 23, 25 in turn merge into respective first and second stabilizing web portions 27, 29 which extend the first and second flange edges 23, 25 in a direction facing away from the cavity 21 and the respective opposing flange edge 23, 25. The stabilizing web portions 27, 29 are also formed from the same composite material as the remainder of structural element 3 and are preferably formed in one-piece with the remaining parts of the structural element 3. The structural element 3 shown in FIG. 1 is a lightweight but nevertheless rigid structure that may, for example, be used in an aerospace vehicle as a supporting structure. The first and second supporting web portions 27, 29 advantageously improve the rigidity of the structural element 3.

The battery set 5 comprises a baseplate 31 and two batteries 33, 35 arranged on the baseplate 31. The batteries 33, 35 are lithium ion batteries. The baseplate 31 is formed such that it can be releasably attached to the structural element 3 in a manner that the baseplate 31 extends from the first flange edge 23 to the second flange edge 25 when the baseplate 31 is attached. The baseplate 31 can, for example, be in contact with the first and second supporting web portions 27, 29 when attached to the structural element 3. The batteries 33, 35 are arranged on an inside surface 37 of the baseplate 31 such that when the baseplate 31 is attached to the structural element 3, i.e., the battery set 5 is mounted to the structural element 3, the batteries 33, 35 are received in the cavity 21.

For mounting the battery set 5 to the structural element 3 the battery set 5 can be moved towards the structural element 3 in the direction of the arrow 39. The battery set 5 of FIG. 1 mounted to the structural element 3 of FIG. 1 is shown in FIG. 2. As can be seen the batteries 33, 35 are dimensioned such that they neatly fit into the cavity 21 defined by the main web 9 and the flanges 11, 13 of the structural element 3. Thus, the structural element 3 not only provides a structural support, for example, for an aircraft but also provides a structure for housing or covering batteries. Thus, the otherwise unused hollow or empty space inside the structural element 3 can advantageously be used for storing batteries. At the same time the battery set can be designed lightweight as no additional cover is required since the structural element 3 also functions as battery cover.

It should be noted that though not shown in the Figures the battery set 5 and structural element 3 comprise a connector for connecting the batteries 33, 35 to the electric system of, for example, an aerospace vehicle. Not shown in FIGS. 1 and 2 is a mount of the structural element 3 for mounting the battery set 5 to the structural element 3 and a lock of the battery set 5 for locking the battery set 5 to the structural element 3. However, an exemplary embodiment of suitable mounting and lock which can be used in the arrangement 1 will now be described with reference to FIGS. 3 and 4.

Figures 3, 4:
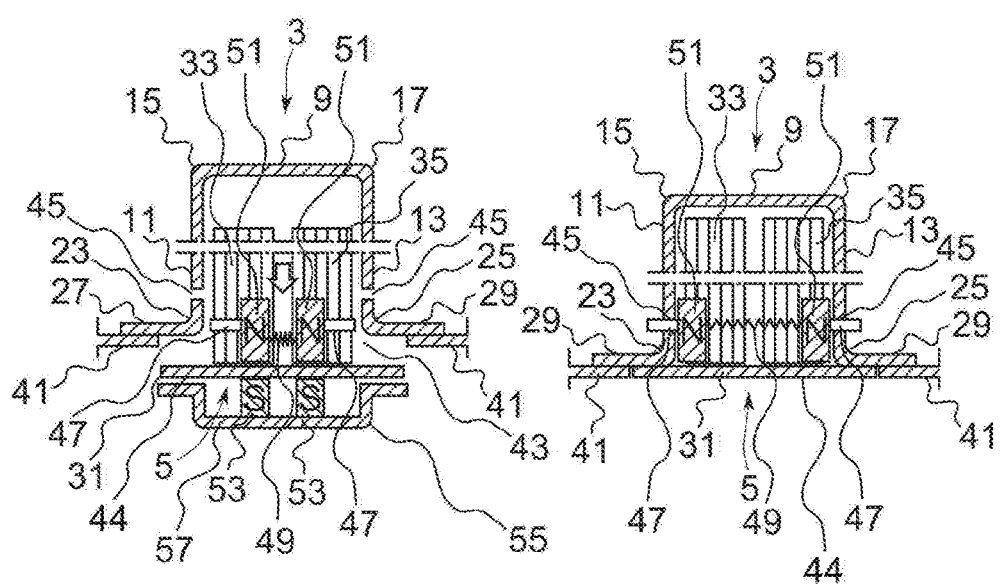
FIG. 3 shows a first sectional view of an exemplary embodiment of an arrangement according to the disclosure herein.
FIG. 4 shows a second sectional view of the exemplary embodiment of FIG. 3.

FIGS. 3 and 4 show an exemplary embodiment of an arrangement 1 of a structural element 3 and a battery set 5 installed in an aircraft wing (not shown). Of the aircraft wing only a section of the pressure side flow surface 41 is shown. The pressure side flow surface 41 comprises a cutout or recess 43 through which the battery set 5 can be mounted to the structural element 3. In FIG. 3 the battery set 5 is shown detached or dismounted from the structural element 3, whereas in FIG. 4 the battery set is mounted to the structural element 3. As can be seen in FIG. 4, when the battery set 5 is mounted to the structural element 4, the outer surface 44 of the baseplate 31 is flush with the pressure side flow surface 41 of the aircraft wing. Hence, the baseplate 31 also serves as the outer surface of the wing. This reduces the overall weight of the aircraft as no additional outer surface is required to cover the recess when the battery has been installed. Further, the time required for exchanging the battery set 5 is reduced as the panel covering the recess 43 in the pressure side flow surface 41 is removed in the same step of procedure as the entire battery set 5.

The arrangement 1 shown in FIGS. 3 and 4 is largely identical to the embodiment described with respect to FIGS. 1 and 2. Therefore, only additional features will be described in more detail.

As can be seen in FIG. 3, the structural element 3 comprises a mount 45 in the form of recesses 45 which are provided in the first and second flanges 11, 13 of the structural element 3. The recesses 45 are provided for engagement with corresponding pins 47 provided as lock 47 which is part of the battery set 5. The pins 47 are arranged movably on the baseplate 31 and can move between a disengaged position shown in FIG. 3 and an engaged position shown in FIG. 4. In the disengaged position shown in FIG. 3 the pins 47 are retracted towards the center of the base plate such that they do not engage with the recesses 45 provided in the structural element 3. In the engaged position as shown in FIG. 4 the pins engage with the recesses 45 provided in the structural element 3 when the battery set 5 has been mounted to the structural element 3. Thereby, the battery set 5 is securely locked or attached to the structural element 3. A biasing structure 49 in form of a spring is provided for biasing the pins 47 towards the engaged position, thereby ensuring that the battery set 5 is securely locked to the structural arrangement 3.

For moving the pins or lock 47 between the engaged and disengaged position they have been attached to locking magnets 51 which can be moved using the magnetic field of a different set of switching magnets 53 which are, for example, arranged on a maintenance device 55 for mounting and dismounting the battery set to the structural element 3. By using the magnetic field of the switching magnets 53 arranged on the maintenance device 55 for moving the pins 47 between the engaged and the disengaged position, advantageously no openings are required in the baseplate 31 of the battery set 5. Hence, the sensitive batteries 33, 35 are arranged in the secure environment of the casing formed by the baseplate 31 and the structural element 3, in particular, during flight and no opening needs to be provided in the baseplate 31.

An exemplary embodiment of a maintenance device 55 will be described in more detail with reference to FIG. 7. As already visible in FIG. 3, the maintenance device 55 comprises a support tray 57 for supporting the battery set 5 while it is mounted and dismounted from the structural element 3.

Figure 5:
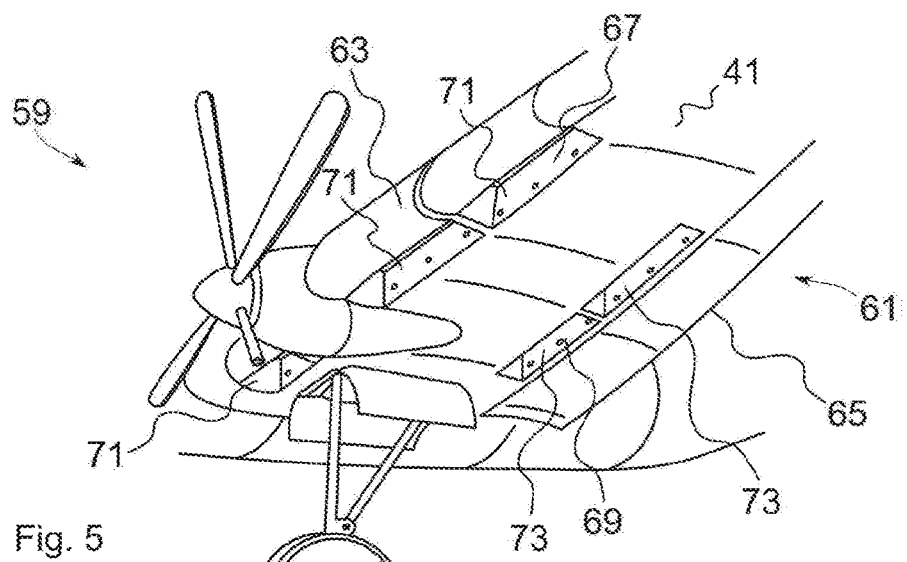
FIG. 5 shows a partial perspective view of an exemplary embodiment of an aerospace vehicle according to the disclosure herein.
Figure 6:
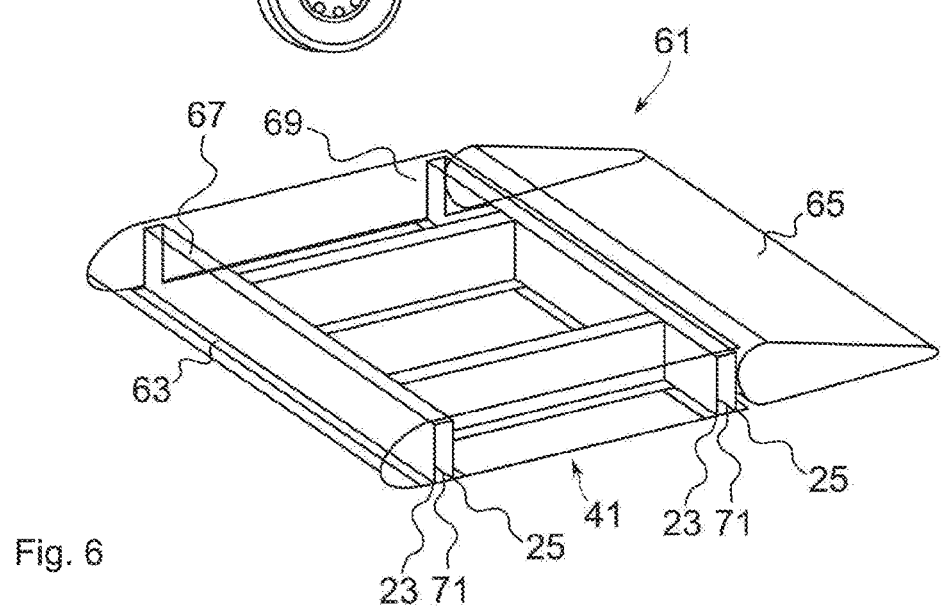
FIG. 6 shows a schematic drawing of a wing of an exemplary embodiment of an aerospace vehicle according to the disclosure herein.

FIG. 5 shows a section of an aerospace vehicle 59 according to the disclosure herein. The aerospace vehicle 59 and comprises a wing 61 which is also shown only in part. A further partial view of the wing 61 is shown in FIG. 6. The wing 61 comprises a slat 63 and a flap 65. In FIG. 5 only the pressure side surface 41 of the wing 61 is visible. As can be seen best in FIG. 6 the wing 61 comprises two structural elements 67, 69 according to the disclosure herein. The first structural element 67 forms a front spar 67 of the wing 61 and the second structural element 69 forms a rear spar 69 of the wing 61. The structural elements 67, 69 are arranged such that the openings 71, 73 defined between the first and second flange edges 23, 25 face towards the pressure side surface 41 of the wing 61 and coincide with openings in the pressure side surface 41 such that battery sets 5 can be mounted to the structural elements 3. The exemplary embodiments of an aerospace vehicle 59 shown in FIG. 5 comprises five openings 71, 73 each adapted for receiving a battery set 5.

The second wing of the aerospace vehicle 59 which is not shown in FIG. 5 may also be formed as shown in FIG. 6. Hence, it is also adapted for receiving battery sets 5 by mounting the battery sets to structural elements 67, 69 forming front and rear spars 67, 69 of the other wing.

As can be readily taken from FIGS. 5 and 6, the embodiment of an aerospace vehicle 59 makes it particularly easy to replace empty batteries with fully charged batteries once the aerospace vehicle 59 has touched down as the openings 71, 73 for receiving the batteries are all on the lower or pressure side 41 of the wing 61. Such an arrangement allows changing of the battery sets 5 during the short time a commercial aircraft is parked at a parking position during two short-distance flights.

Figure 7:
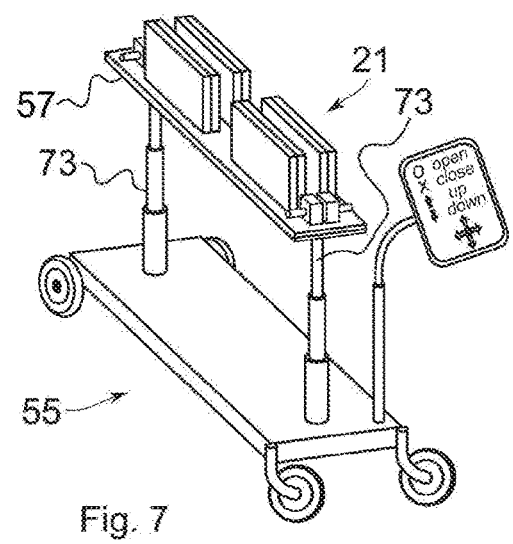
FIG. 7 shows a perspective view of an example structure for mounting and dismounting an example embodiment of a battery set.

FIG. 7 shows an exemplary embodiment of a maintenance device 55 in form of a transport cart 55. The maintenance device 55 comprises a support tray 57 supporting a battery set 21. The support tray 57 is arranged on hydraulic actuators 73 for hydraulically moving the battery set 21 up and down for mounting the battery set 21 to a structural element 3. The maintenance device 55 further comprises a control panel 75 which can be used to move the support tray 57 up and down and to change the position of the maintenance device 55 on the ground. Further, controls are provided for locking and unlocking a mounted battery set by moving lock 47 such as those shown in FIGS. 3 and 4 between the engaged and the disengaged position.

In a preferred embodiment (not shown in Figures) the maintenance device would be operated fully autonomously. It is further preferred if the maintenance device 55 comprises a second support tray 57 arranged on a second set of hydraulic actuators 73. This enables a shorter turnaround time when replacing empty batteries with fully charged batteries as the same maintenance vehicle 55 could be used to remove an empty battery set 21 with the first support tray 57 and immediately put a second battery set 21 in the now empty cavity 21 using the second support tray 57.

Figure 8:
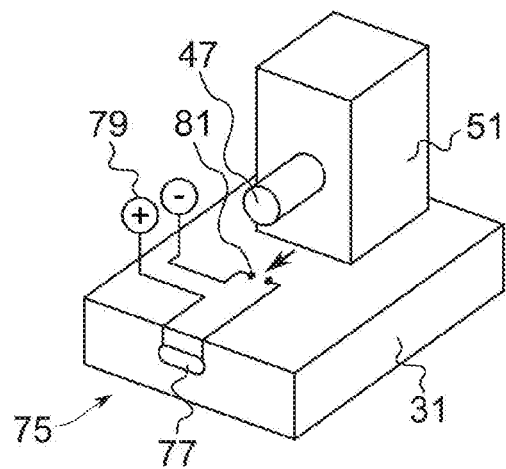
FIG. 8 shows a first perspective view of an exemplary embodiment of a lock for locking a battery set to a structural element.
Figure 9:
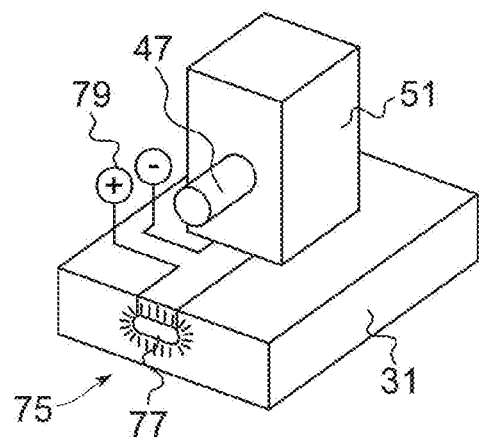
FIG. 9 shows a second perspective view of the exemplary embodiment of a lock of FIG. 8.

FIGS. 8 and 9 show a further embodiment of a lock 47 based on the lock 47 already described with respect to FIGS. 3 and 4. The lock 47 is again formed as a pin 47 attached to a magnet 51 and movable between an engaged position shown in FIG. 9 and a disengaged position shown in FIG. 8. The lock 47 can be moved between the engaged and the disengaged position by moving the magnets 51 as previously described.

This embodiment additionally comprises an indicator 75 for indicating that the lock 47 is in the engaged or locking position. The indicator comprises a light source 77, preferably in the form of a light emitting diode, and a power source 79 providing energy for the light source. Two contacts 81 are provided which are arranged such that the contacts 81 are not in electrical contact if the lock 51 is in the disengaged or unlocked position as shown in FIG. 8. In this position, no power is supplied from the power source 79 to the light source 77 which is therefore not emitting any light. If the lock 51 is moved to the engaged or locked position as shown in FIG. 9, the two contacts 81 are connected and the light source 77 is supplied with power from the power source 79. The light source 77 is preferably arranged in the baseplate 31 of a battery set 5 such that the light emitted by the light source 77 is visible from the outside of the structural element 3 when the battery set 5 has been mounted.

Figure 10:
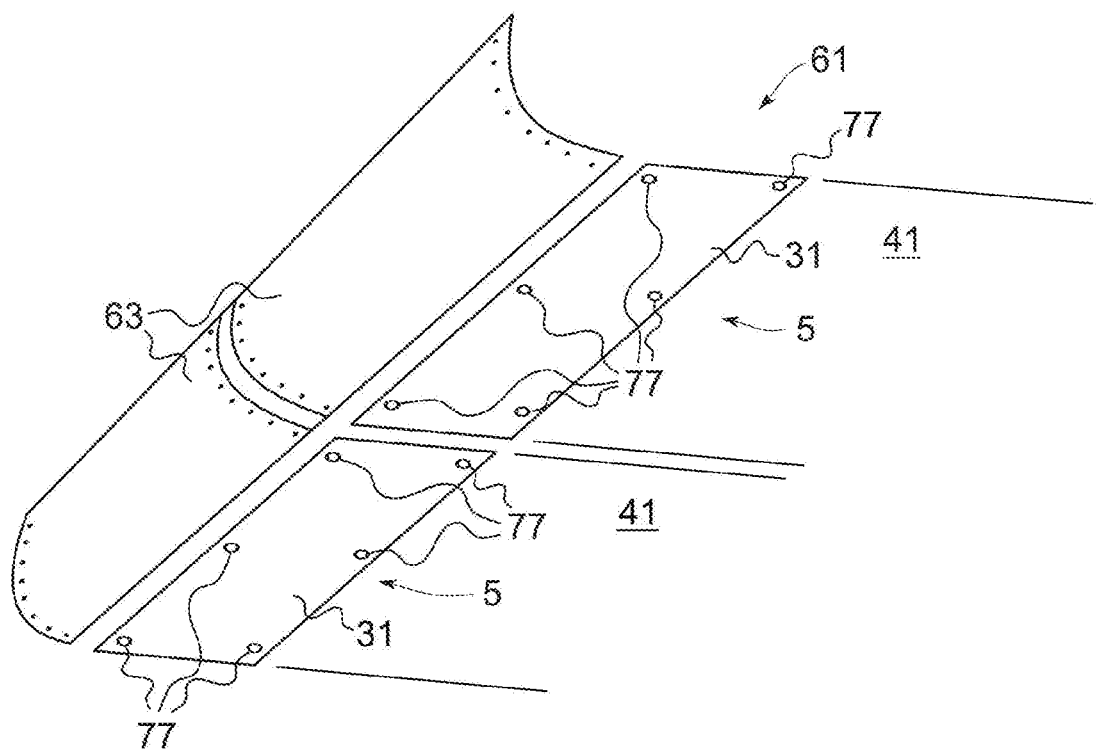
FIG. 10 shows a perspective view of a wing of an exemplary embodiment of an aerospace vehicle according to the disclosure herein.

FIG. 10 shows an example of two battery sets 5 mounted on a structural element forming the front spar (not visible in FIG. 10) of a wing 61. Six light sources 77 are shown for each battery set 21. Each light source 77 is part of an indicating device provided for a lock. The indicator provides a simple way to verify that the battery sets have been correctly installed in the front spar of the wing 61. Note that in FIG. 10 the baseplates 31 are flush with and part of the pressure side surface 41 of the wing 61.

It should be noted that the indicating device 75 can be used in all previously described embodiments.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An arrangement comprising:
    a structural element extending along a longitudinal direction and having a main web, a first flange that extends away from the main web and comprises a first flange edge extending along the longitudinal direction, and a second flange that comprises a second flange edge extending along the longitudinal direction and extends away from the main web in a position spaced apart from the first flange, such that the first flange, the second flange, and the main web form a U-shaped profile defining a cavity; and
    a battery set comprising:
        a baseplate that is releasably attached to the structural element for mounting the battery set to the structural element, wherein, when the baseplate is attached to the structural element, the baseplate extends from the first flange edge to the second flange edge; and
        at least one battery on the baseplate, wherein, when the baseplate is attached to the structural element, the at least one battery on the baseplate is received in the cavity;
    wherein an outer surface of the baseplate facing away from the at least one battery on the baseplate is adapted to be part of an outer wall of an aerospace vehicle when mounted to the structural element; and
    wherein the structural element is a spar of a wing of the aerospace vehicle and the outer surface of the baseplate is part of a pressure side surface of the wing of the aerospace vehicle.

2. The arrangement of claim 1, wherein:
    the structural element comprises a first stabilizing web portion, which extends the first flange edge in a direction pointing away from the second flange edge and in parallel to the main web, and/or
    the structural element comprises a second stabilizing web portion, which extends the second flange edge in a direction pointing away from the first flange edge and in parallel to the main web.

3. The arrangement of claim 1, wherein the battery set comprises a lock for locking the battery set to the structural element.

4. The arrangement of claim 1, wherein the structural element comprises a mount for releasably mounting the battery set to the structural element.

5. The arrangement of claim 1, wherein the structural element comprises a mount for releasably mounting the battery set to the structural element and the battery set comprises a lock for releasably locking the battery set to the structural element.

6. An aerospace vehicle comprising:
    a wing with a pressure side surface; and
    an arrangement comprising:
        a structural element that extends along a longitudinal direction and comprises a main web, a first flange that extends away from the main web and comprises a first flange edge extending along the longitudinal direction, and a second flange that comprises a second flange edge extending along the longitudinal direction and extends away from the main web in a position spaced apart from the first flange, such that the first flange, the second flange, and the main web form a U-shaped profile defining a cavity; and
        a battery set comprising:
            a baseplate that is releasably attached to the structural element for mounting the battery set to the structural element, wherein, when the baseplate is attached to the structural element, the baseplate extends from the first flange edge to the second flange edge; and
            at least one battery on the baseplate, wherein, when the baseplate is attached to the structural element, the at least one battery on the baseplate is received in the cavity;
    wherein the structural element is a spar of the wing; and
    wherein the pressure side surface of the wing comprises a cutout, such that the battery set can be mounted to structural element.

7. The aerospace vehicle according to claim 6, wherein an outer surface of the baseplate of the battery set at least partly forms the pressure side surface of the wing in a region of the cutout when the battery set is mounted to the structural element.

8. The aerospace vehicle according to claim 6, wherein the structural element comprises a mount for releasably mounting the battery set to the structural element.

9. The aerospace vehicle according to claim 8, wherein the structural element comprises:
    a first stabilizing web portion, which extends the first flange edge in a direction pointing away from the second flange edge and in parallel to the main web, and/or
    a second stabilizing web portion, which extends the second flange edge in a direction pointing away from the first flange edge and in parallel to the main web.

10. The aerospace vehicle according to claim 6, wherein the battery set comprises a lock for locking the battery set to the structural element.

11. The aerospace vehicle according to claim 6, wherein the structural element comprises a mount for releasably mounting the battery set to the structural element and the battery set comprises a lock for releasably locking the battery set to the structural element.

* * * * *